Figure 1:
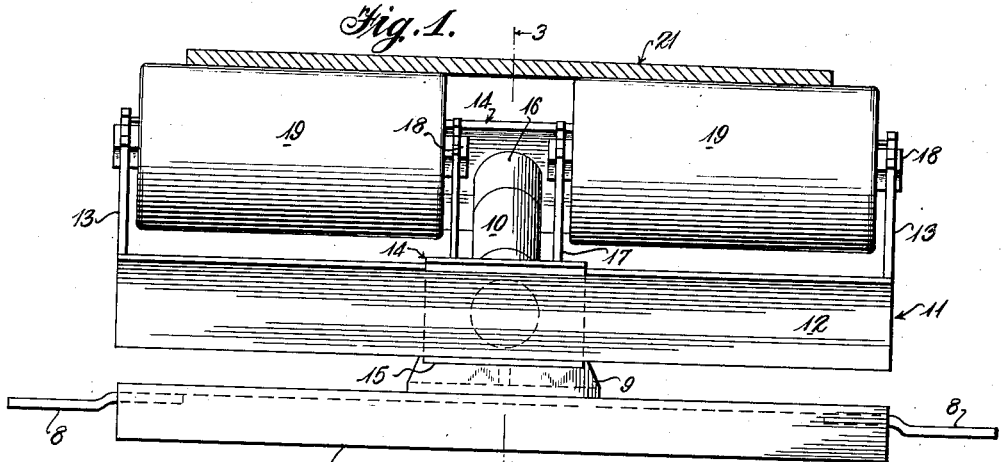

Sept. 23, 1941.   R. W. PARKER   2,256,685
SELF-ALIGNING IDLER FOR BELT CONVEYERS
Original Filed Oct. 7, 1938   2 Sheets-Sheet 1

Inventor
Richard W. Parker
By L. Donald Myers   Attorney

Sept. 23, 1941.   R. W. PARKER   2,256,685
SELF-ALIGNING IDLER FOR BELT CONVEYERS
Original Filed Oct. 7, 1938   2 Sheets-Sheet 2
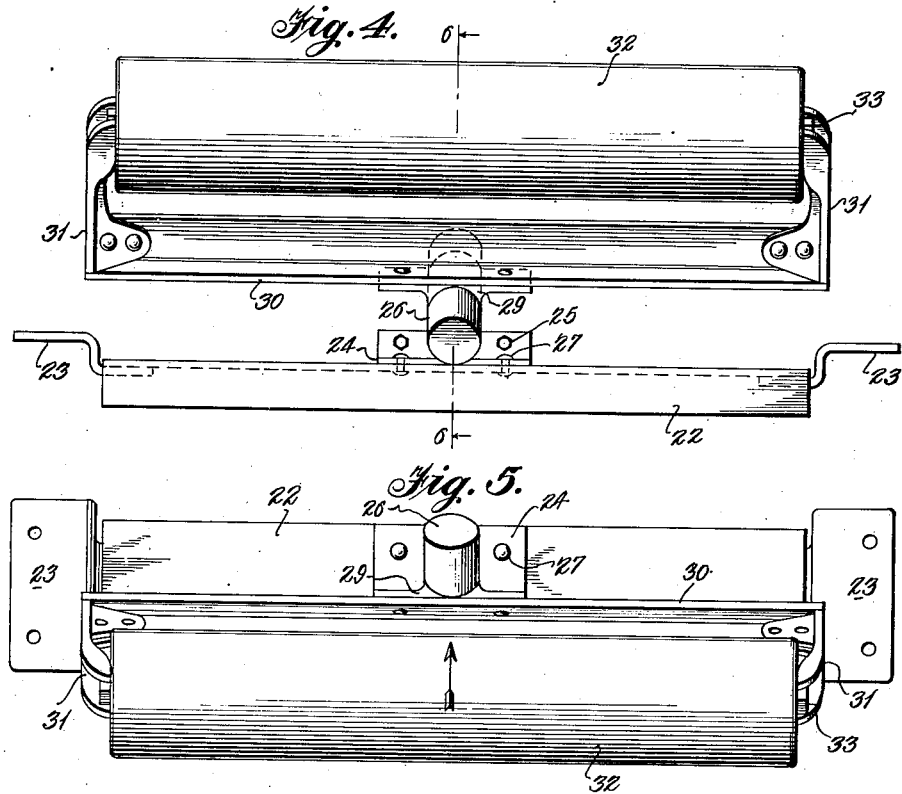
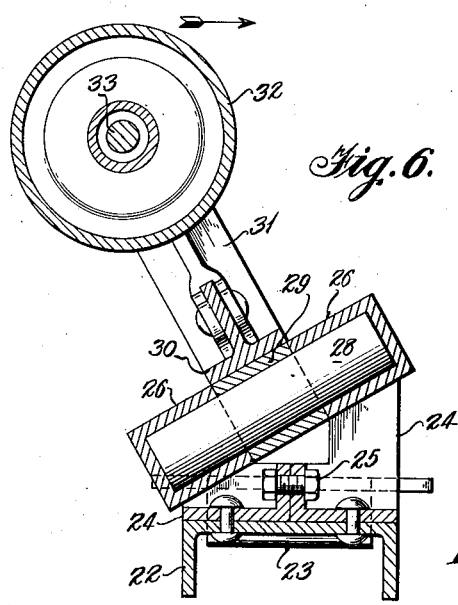
Inventor
Richard W. Parker
By L. Donald Meyers
Attorney Patented Sept. 23, 1941

2,256,685

UNITED STATES PATENT OFFICE 2,256,685

SELF-ALIGNING IDLER FOR BELT CONVEYERS

Richard W. Parker, Indianapolis, Ind., assignor to Link-Belt Company, a corporation of Illinois Original application October 7, 1938, Serial No. 233,847, now Patent No. 2,225,276, dated December 17, 1940. Divided and this application November 25, 1939, Serial No. 306,169

5 Claims. (Cl. 198—202)

This invention relates to new and useful improvements in self-aligning idlers for belt conveyers. This application is a division of my copending application which matured into Patent No. 2,225,276 on December 17, 1940.

It is extremely difficult to maintain the belts of belt conveyers running in proper alignment with respect to the fixed carrying idlers employed for supporting the active and inactive runs of the belt. Such misalignment, of course, may result from any one or more of several different causes; such as improper transverse loading of the belt, improper alignment of the several fixed carrying idlers, uneven longitudinal stretching and shrinking of the opposite edge portions of belts carrying wet loads, such as sand and gravel, due to uneven transverse drying during inactive periods, and the like. This problem of alignment is encountered with both the active and inactive runs of flat belt conveyors and the flat return or inactive run of troughed belt conveyers. As the roll or rolls of the idlers embodying this invention are shaped and arranged to take care of flat runs, either active or inactive, of belt conveyers, this invention is particularly concerned with realignment of such runs.

It is the present practice to employ some form of mechanism which will operate automatically, in response to misalignment of a belt, to train the belt back into a normal transverse position. Most of such devices consist of self-aligning idlers substituted for certain of the fixed carrying idlers of a belt conveyer. Each of these self-aligning idlers includes an idler frame supported for rotating or swiveling movement about the axis of a vertically arranged gudgeon. Movement of the idler frame to effect training of the belt is accomplished by means of some force-developing instrumentality which is added to and operatively associated with the idler frame or the roll or rolls carried thereby. These instrumentalities usually take the form of small guiding or actuating rolls against which the belt edges bear and with the said rolls arranged relative to the idler frame so that engagement of one of the rolls by an edge of a misaligned belt will cause the idler frame to move to train the belt back into its proper position; brake shoes which drag on the belt or idler rolls and thereby cause proper swinging movement of the idler frame, or counter-weighted members rotatably carried by the idler frame and functioning to develop inertia when they are rotated as a result of engagement with the belt. Such self-aligning idlers naturally cost more than the conventional fixed carrying idlers and usually require more space to accommodate the force-developing instrumentalities.

It is the primary object of this invention to provide self-aligning idlers for belt conveyers, of both flat and troughed belt type and more specifically for the active and inactive runs of flat belts and the inactive runs of troughed belts, whose construction is much simpler, more compact, and less expensive than the self-aligning idlers now in common use.

A further important object of the invention is to provide self-aligning idlers which possess the aforementioned advantages primarily because of the fact that they do not require the addition of force-developing instrumentalities to rotate the idler frames to bring about the desired belt training movement of the frames.

A still further object of the invention is to provide a self-aligning idler of the rotatable frame type in which the frame is supported for movement in such a manner that misalignment of a belt relative thereto will produce an unbalanced weight condition which will supply the force required to effect the necessary belt training movement of the idler frame.

Another object of the invention is to provide a self-aligning idler in which the various elements are so arranged as to reduce the over all depth of the idler, which in many installations is a great advantage.

Another object of the invention is to provide a self-aligning idler for flat belts, in either active or inactive runs, which will not damage the belt edge as a result of contact with a force-developing instrumentality.

Other objects and advantages of the invention will be apparent during the course of the following description.

Figure 2:
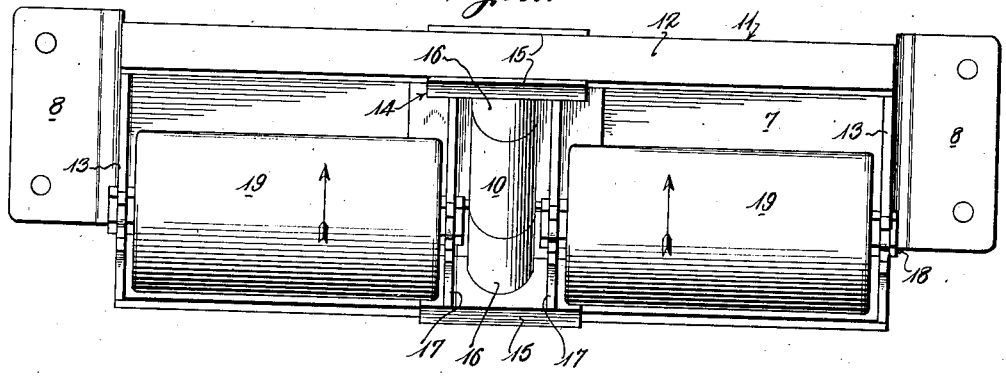
Figure 3:
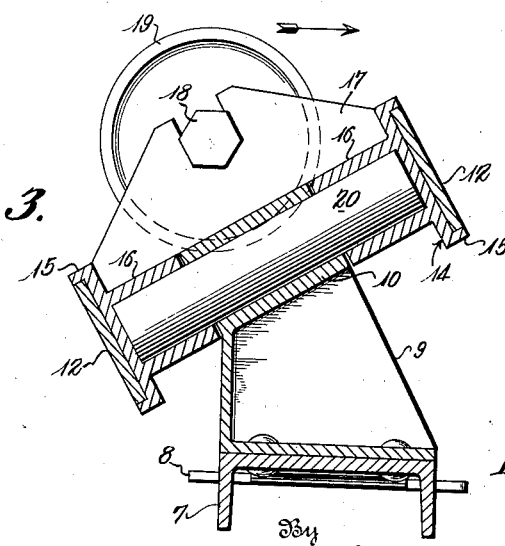

In the accompanying drawings forming a part of this specification and in which like numerals are employed to designate like parts throughout the same, Figure 1 is an elevational view of a self-aligning idler embodying this invention, Figure 2 is a top plan view of the idler structure disclosed in Fig. 1, Figure 3 is a vertical sectional view taken on line 3—3 of Fig. 1, Figure 4 is an elevational view of a modified form of self-aligning idler embodying this invention, Figure 5 is a top plan view of the self-aligning idler structure disclosed in Fig. 4, and Figure 6 is a vertical sectional view taken on line 6—6 of Fig. 4.

In the drawings, wherein for the purpose of illustration are shown the preferred embodiments of this invention, and particularly referring to Figs. 1 to 3, inclusive, there is disclosed a self-aligning idler structure which is intended for use in training load carrying runs of flat belts or inactive runs of either flat or troughed belts. In these figures, the reference character 7 designates a channel base to the opposite ends of which attaching brackets 8 are welded. These brackets are employed to attach the base to the stringers of a belt conveyer, not shown. This channel base is arranged with its top surface extending truly horizontally. Riveted to the center of the channel base is a bearing bracket 9 provided with the bearing sleeve 10 at its upper end. Fig. 1 clearly discloses the fact that the axis of this bearing sleeve 10 is inclined.

A rectangularly shaped idler frame 11 is provided and is formed of longitudinally extending side bars 12 which are interconnected at their opposite ends by means of end brackets 13. These ends brackets are suitably welded to the side bars 12. At the central portion of the idler frame 11, there are arranged two bearing brackets 14. These brackets have channel ends portions 15 for receiving the frame bars 12 and bearing sleeves or sockets 16 which are spaced at their adjacent ends and are arranged in axial alignment with each other. For the purpose of retaining the two bearing brackets 14 in their desired spaced, aligned positions, bracket arms 17 are provided and are arranged as is best illustrated in Figs. 2 and 3. The four brackets 13 and 17 may be considered as being arranged in two pairs with each pair functioning to support the shaft 18 of an idler roll 19. These two idler rolls 19, therefore, are spaced at their adjacent ends to accommodate the bracket members 17 and the bearing sleeves 16. A gudgeon 20 is received within the bearing sleeves 10 and 16 for pivotally connecting the idler frame and its rolls to the bracket 9. As is clearly illustrated in Fig. 3, the axis of the gudgeon 20 is inclined. Due to the provision of the two rolls 19 which are axially spaced and the arrangement of the bearing sleeves 16 in the space between these two rolls, the overall height of the entire self-aligning idler structure is reduced.

The structure of Figs. 1 to 3, inclusive, may be assembled as follows. The gudgeon 20 first may be attached to the bearing sleeve 10 of the bracket 9. With the gudgeon positioned in this manner, the lower bearing sleeve 16 may be applied to the lower end of the gudgeon with the bracket arms 17 attached, as by welding, to the channel end portion 15 of the lower bearing sleeve 16. The upper bearing sleeve 16 then may be applied to the upper end of the gudgeon and suitably attached, as by welding, to the bracket arms 17. One of the longitudinally extending side bars 12, with the end brackets 13 welded thereto, then may be fitted in the channel of its end portion 15. The final step in the assembly consists of positioning the remaining longitudinally extending side bar 12 in its channel of the end portion 15 and welding the ends of this last side bar 12 to the end brackets 13. The four end brackets 13 and 17 are then positioned in readiness to receive the shafts 18 of the two idler rolls 19.

Fig. 1 discloses a flat load carrying belt, or a return or inactive run of a belt, 21 resting on the rolls 19. Due to the positioning of the roll shaft 18 above the gudgeon 20 and laterally of the gudgeon axis, the roll axes will be permitted to move in an arc or a plane which is inclined or arranged at right angles to the axis of the gudgeon and positioned to intersect the gudgeon between its ends. When the belt 21 moves out of proper alignment with respect to this self-aligning idler structure, the idler frame 11 and its rolls 19 become unbalanced and are caused to swivel about the axis of the gudgeon. One of the rolls 19 and the cooperating portion of the idler frame will dip downwardly and forwardly while the remaining roll and its portion of the idler frame will move upwardly and rearwardly. Due to the positioning of the rolls 19 above the gudgeon and between the ends of the same, the load imposed upon the rolls by the belt and its load will be applied radially to the bearing sleeves 19 and 16.

The form of self-aligning idler disclosed in Figs. 4 to 6, inclusive, which is intended for use in training a flat belt, in either an active or an inactive run, includes a channel base 22 to the opposite ends of which are welded the attaching brackets 23. These attaching brackets are intended to mount the idler upon the stringers of a belt conveyer frame, not shown. The attaching brackets support the channel base 22 in the plane of the stringers.

A pair of bearing brackets 24 is provided and these brackets are interconnected by the securing elements 25 which may take the form of bolts and nuts. These elements interconnect the two bearing brackets 24 so that their bearing sleeves or sockets 26 will be arranged in spaced, axial alignment. To fasten the bearing brackets to the center of the top of the channel base 22, rivets 27 are employed. It will be noted that the aligned bearing cups or sleeves 26 have their common axis inclined. A gudgeon 28 is mounted in the bearing openings of the sleeves 26 and has attached to the portion of the same arranged between the bearing sleeves 26 a bearing bracket 29 which is attached to the middle portion of a T-shaped idler frame 30.

This idler frame has attached to the same the upstanding arms 31 which function to rotatably support the idler roll 32 by means of its shaft 33.

Fig. 6 clearly discloses the fact that the gudgeon 28 is supported with its axis inclined. The idler frame 30 with its roll 32 is centrally attached to the gudgeon 28 for swinging movement about the inclined axis of this gudgeon. The idler frame 30 and its roll, therefore, will move through an arcuate path or a plane which is inclined and which intersects the gudgeon between its ends. As the roll 32 is located above the gudgeon and is attached to the latter at a point intermediate its ends, any load applied to the roll 32 will be delivered radially to the bearing cups 26 and the bearing bracket 29. The laterally spaced arrangement of the roll shaft 33 with respect to the gudgeon will cause the roll to partake of a caster movement with respect to the axis of the gudgeon.

When a belt riding on the roll 32 becomes misaligned, the roll and its frame will become unbalanced and one side of the roll and frame will dip downwardly and forwardly while the remaining side of the roll and frame will move upwardly and rearwardly. This swiveling movement of the roll will retain or move the belt back into its normal transverse position.

Considering the two different forms of self-aligning idlers, it will be seen that each one possesses an idler frame which carries one or more idler rolls with the frame and rolls partaking of pivotal movement about the axis of a gudgeon which is inclined at an angle lying between the perpendicular and the horizontal. This angle of inclination should be from 20° to 50° to obtain the best results. The devices employed for connecting the idler roll or idler rolls to the gudgeon are so constructed and arranged in each idler structure as to position the roll or rolls, or at least their axes, laterally of any vertical plane passing through the supporting base and laterally of the axis of rotation of the supporting gudgeon. The rolls, therefore, partake of the movement of a caster wheel about the gudgeon axis. This caster movement is modified by the inclination of the gudgeon axis so that pivotal movement of the idler frame and its roll or rolls causes one side of the movable elements to dip downwardly and forwardly with respect to the direction of travel of the conveyer belt, which direction is indicated by arrows in the several figures, while the remaining side of the movable structure moves upwardly and rearwardly. Although plane bearings, gudgeons, and the like, have been shown for the various pivot points, it will be understood that anti-friction and other types of bearings can be employed without modifying the invention.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A self-aligning idler for belt conveyers comprising a roll for flatly supporting the width of a belt run with the roll being arranged normally in parallelism with the plane of the flat belt, an idler frame for carrying the roll, a tubular bracket attached to the central portion of the idler frame and arranged so that a plane containing the roll axis and normal to the tubular bracket axis will bisect said bracket, a gudgeon secured in the bore of the tubular bracket and projecting equal distances therefrom at its opposite ends, a pair of bearing members each having a bearing cup to freely rotatably receive and completely enclose a projecting end of the gudgeon, said bearing members being relatively shaped and arranged to support the gudgeon at an inclination to the path of travel of and in the direction of departure of the belt so that the aforesaid plane will be inclined to the path of travel of and in the direction of approach of the belt, and means for supporting said pair of bearing members.

2. A self-aligning idler for belt conveyers, comprising a bracket, an idler frame, idler roll means mounted on the idler frame, and a gudgeon, said bracket having means for supporting the gudgeon with its axis inclined to the plane of travel of the belt, said idler frame having means for mounting it on the gudgeon for swinging movement about the axis of the gudgeon, the axis of the idler roll means, during swinging movement of the idler frame, traveling in an inclined plane which is normal to the axis of the gudgeon and which bisects the gudgeon substantially at its longitudinal center, the means of said bracket and the means of said idler frame comprising three cylindrical sections which collectively enclose the entire length of the gudgeon, the intermediate one of said three sections being arranged to be bisected by the aforesaid plane of travel of the idler roll means axis and being attached to the gudgeon, the two end sections being closed at their outer ends to cover the end faces of the gudgeon and thereby complete the enclosing of the gudgeon.

3. A self-aligning idler for belt conveyers, comprising a bracket, an idler frame, idler roll means including a pair of axially spaced aligned rolls journaled in the idler frame, and a gudgeon, said bracket having means for supporting the gudgeon with its axis inclined to the plane of travel of the belt, said idler frame having means for mounting it on the gudgeon for swinging movement about the axis of the gudgeon and with the gudgeon lying opposite to the space between the adjacent ends of the rolls, the axis of the idler roll means, during swinging movement of the idler frame, traveling in an inclined plane which is normal to the axis of the gudgeon and which bisects the gudgeon substantially at its longitudinal center, the means of said bracket and the means of said idler frame comprising three cylindrical sections which collectively enclose the entire length of the gudgeon, the intermediate one of said three sections being arranged to be bisected by the aforesaid plane of travel of the idler roll means axis and being attached to the gudgeon, the two end sections being closed at their outer ends to cover the end faces of the gudgeon and thereby complete the enclosing of the gudgeon.

4. A self-aligning idler for belt conveyers, comprising a bracket, a rectangular idler frame including two pairs of roll supporting members, idler roll means including a pair of axially aligned rolls journaled in the two pairs of supporting members of the idler frame, and a gudgeon, said bracket having means for supporting the gudgeon with its axis inclined to the plane of travel of the belt, said idler frame having means for mounting it on the gudgeon for swinging movement about the axis of the gudgeon and with the gudgeon lying opposite to the space between the adjacent ends of the rolls, the axis of the idler roll means, during swinging movement of the idler frame, traveling in an inclined plane which is normal to the axis of the gudgeon and which bisects the gudgeon substantially at its longitudinal center, the means of said bracket and the means of said idler frame comprising three cylindrical sections which collectively enclose the entire length of the gudgeon, the intermediate one of said three sections being arranged to be bisected by the aforesaid plane of travel of the idler roll means axis and being attached to the gudgeon, the two end sections being closed at their outer ends to cover the end faces of the gudgeon and thereby complete the enclosing of the gudgeon.

5. A self-aligning idler for belt conveyers, comprising a bracket, a rectangular idler frame including two pairs of roll supporting members arranged to define two roll receiving spaces which are separated from each other at their adjacent ends, idler roll means including a pair of rolls journaled in the two pairs of supporting members so as to occupy the said roll receiving spaces, and a gudgeon, said bracket having means for supporting the gudgeon with its axis inclined to the plane of travel of the belt, said idler roll having means for mounting it on the gudgeon for swinging movement about the axis of the gudgeon and with the gudgeon arranged between the separated ends of said roll receiving spaces, the axis of the idler roll means, during swinging movement of the idler frame, traveling in an inclined plane which is normal to the axis of the gudgeon and which bisects the gudgeon substantially at its longitudinal center, the means of said bracket and the means of said idler frame comprising three cylindrical sections which collectively enclose the entire length of the gudgeon, the intermediate one of said three sections being arranged to be bisected by the aforesaid plane of travel of the idler roll means axis and being attached to the gudgeon, the two end sections being closed at their outer ends to cover the end faces of the gudgeon and thereby complete the enclosing of the gudgeon.

RICHARD W. PARKER.